United States Patent Office 3,320,232
Patented May 16, 1967

3,320,232
DISPERSIBLE MONO AZO DYES
Hans E. Wegmüller and Werner Bossard, Riehen, Switzerland, assignors to J. R. Geigy, A.-G., Basel, Switzerland
No Drawing. Filed Feb. 7, 1964, Ser. No. 343,202
Claims priority, application Switzerland, Feb. 15, 1963, 1,904/63, 1,905/63
5 Claims. (Cl. 260—153)

The invention concerns new dispersion dyestuffs which do not contain metal and are difficultly soluble in water, processes for their production, processes for the dyeing of hydrophobic organic fibers using the new dyestuffs and, as industrial product, the material dyed with the aid of these dyestuffs.

In the scale of shades hitherto available for the disperse dyeing of polyester fibers, there has been lacking a yellow to orange shade which would combine in dyeings on the said fibers, optimal wet fastnesses, fastness to light and to sublimation, with a satisfactory drawing power on the said fibers, and good compatibility with blue shades due to an especially good migratory power in these fibers.

Known yellow polyester dyes show sufficient drawing power and fastness to sublimation, but were found wanting in one or several of the other above-named properties. Disperse azo dyes containing a 1-phenyl-3-methyl-5-pyrazolone coupling component, which would be particularly desirable for economic reasons, fail even in the two last-named properties. Sulfonic acid aryl ester- and sulfamyl-substituted derivatives of the last-mentioned dyestuff class fail particularly in compatibility with blue shades. The resulting green shades are often uneven and skittery.

It is, therefore, a principal object of the present invention to provide disperse azo dyes of similar accessibility as the aforementioned azo dyes containing 1-phenyl-3-methyl-5-pyrazolone coupling components, which, however, combine most or all of the above-listed desirable properties.

This object and others which will become apparent as the description of this invention proceeds, are attained by the azo dyestuffs according to the invention, which dyestuffs must be free from groups dissociating acid in water, particularly from —COOH and —SO$_3$H groups, the diazo component of which must be free from easily metallizable substituents such as, for instance, a hydroxyl group in ortho-position to the azo bridge, and which dyestuffs are (a) Dyestuffs of the formula:

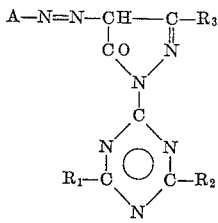

(IA)

wherein

A represents an azo dyestuff diazo component radical which is a benzene diazo component, a naphthalene diazo component, a thiazole diazo component, or a benzothiazole diazo component radical, R$_1$ represents —NH$_2$, N-alkyl-amino wherein "alkyl" is of from 1 to 6 carbon atoms, N-hydroxy-alkylamino wherein "alkyl" is of from 2 to 6 carbon atoms, N-lower alkoxy-alkylamino wherein alkyl is of from 2 to 4 carbon atoms, β-cyanoethyl amino, N,N-dialkyl-amino, N,N-bis-(hydroxy-alkyl)-amino wherein each alkyl is of from 2 to 3 carbon atoms, N-alkyl-N-hydroxy-alkyl-amino wherein "hydroxy-alkyl" is of from 2 to 3 carbon atoms, N-alkyl-N-alkoxy-alkyl-amino wherein the last-mentioned alkyl is of from 2 to 3 carbon atoms, N,N-bis-(β-cyano-ethyl)-amino, piperidinyl-(1), morpholinyl-(1), alkoxy of from 1 to 6 carbon atoms, chloro- and bromo-alkoxy, alkoxy-alkoxy, cyano-alkoxy, or, finally alkylthio of from 1 to 6 carbon atoms;

R$_2$ represents a radical defined above under R$_1$, or hydroxy, mercapto or, further, Phenylamino, chlorophenylamino, bromophenylamino, lower alkyl phenylamino, lower alkoxy phenylamino, cyclohexylamino, ben z y l a m i n o, phenylethylamino, N-lower alkyl-N-phenylamino, N-lower alkyl-N-cyclohexylamino, N-lower alkyl-N-benzylamino, benzyloxy or cyclohexyloxy, and R$_3$ represents alkyl, phenyl, alkylphenyl and alkoxycarbonyl, carbamyl, N-alkyl-carbamyl and N,N-dialkyl-carbamyl which dyestuffs are also preferably free from sulfamyl radicals and aryloxy-sulfonyl radicals; and (b) Dyestuffs which are also free from the afore-mentioned radicals, and are of the formula

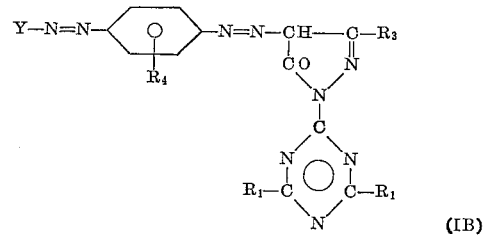

(IB)

wherein

Y represents a benzene diazo component radical,

R$_1$ and R$_3$ have the meanings given hereinbefore, and

R$_4$ represents from one to two hydrogen atoms, alkyl groups or alkoxy groups.

The foregoing dyestuffs of Formulas IA and IB, according to the invention, as well as other structurally related compounds which are also useful as dyestuffs, are obtained by coupling an aromatic diazonium compound of the carbocyclic or heterocyclic series defined hereinafter with a compound of the formula

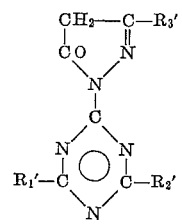

(I)

wherein

R$_1$' and R$_2$' each represent an inert monovalent substituent, and

R$_3$' represents a hydrocarbon radical, a carboxylic acid alkyl ester or a carboxylic acid amide group; whereby a dyestuff of the general formula

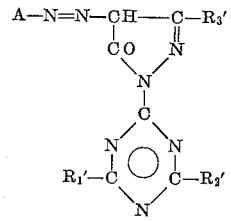

(II)

wherein

A represents the radical of the aromatic, carbocyclic or heterocyclic diazonium compound, and R$_1$', R$_2$' and R$_3$' have the meanings given in Formula I, is formed.

The diazo and coupling components are so chosen that the dyestuff contains no water-solubilizing groups which dissociate acid in water.

By "inert" monovalent substituents, there are meant substituents which are inert under the dyeing conditions under which the dyestuffs are applied to polyester fibers.

As carbocyclic diazonium compounds, preferably those of the benzene series or also those of the naphthalene series are used. Heterocyclic diazonium compounds have chiefly 5- or 6-membered rings, particularly rings containing nitrogen, which may be fused with carbocyclic rings. Preferred heterocycles contain one nitrogen atom in the ring in a position vicinal to the azo bond and are of, in particular, the thiazole, triazole, tetrazole, thiadiazole, oxadiazole, pyrazole, pyridine, benzthiazole or indazole series.

The ring or rings of the diazo component radicals A of the carbocyclic series can be unsubstituted or they can be mono- to tri-substituted by identical or different substituents. These substituents comprise, on the one hand, the following nucleophilic substituents: alkyl groups, cycloalkyl groups, in particular those having 6 to 8 carbon atoms, preferably unsubstituted, but also alkyl- or halogen-substituted phenyl, benzyl or phenylethyl groups; as ether groups alkoxy and hydroxyalkoxy groups, preferably unsubstituted, but also halogen-, alkyl- or alkoxy-substituted phenoxy and phenylthio groups; the following acylamino groups: preferably unsubstituted, but comprising also halogen-substituted alkanoylamino groups, alkoxy carbonylamino groups and alkylsulfonylamino groups, unsubstituted benzoylamino and phenylsulfonylamino groups, or benzoylamino or phenylsulfonylamino groups which are alkyl- or halogen-substituted, halogenotriazinylamino or halogenopyrimidylamino groups.

The terms "alkyl," "alkoxy" and "alkanoyl" as used in this specification and in the appended claims to define substituents, mean those having from 1 to 4 carbon atoms, unless expressly stated otherwise; the term "halogen" used to define substituents, means bromine or chlorine. Preferably, from one to two of the aforesaid nucleophilic substituents are present in combination with one or two of the electrophilic substituents defined further below.

Examples of such nucleophilic substituents of carbocyclic, particularly benzene, rings are: methyl, ethyl, i-propyl, tert. butyl, tert. amyl, octyl, cyclohexyl, phenyl, monomethylphenyl and dimethylphenyl, chlorophenyl, dichlorophenyl, bromophenyl, benzyl, mono- and di-methylbenzyl or chlorobenzyl groups, methoxy, ethoxy, 2-hydroxyethoxy, butoxy, phenoxy, cresoxy, chlorophenoxy, bromophenoxy, phenylthio, methylphenylthio or chlorophenylthio groups, acetylamino, chloroacetylamino, bromoacetylamino, β-chloropropionylamino, propionylamino, carbomethoxyamino, carbethoxyamino, carbobutoxyamino, methylsulfonylamino, chloromethylsulfonylamino and ethylsulfonylamino groups, phenylsulfonylamino, tolylsulfonylamino, chlorophenylsulfonylamino, bromophenylsulfonylamino, benzoylamino, chlorobenzoylamino and methylbenzoylamino groups, 4,6-dichlorotriazinylamino or 2,4,5-trichloropyrimidylamino groups.

When it is a carbocyclic ring, A preferably contains, on the other hand, electrophilic substituents of which preferably one or two can be present therein either alone, or together with the one to two of the nucleopilic substituents mentioned above. "Electrophilic substituents" as used in this specification means unsubstituted or halogen-substituted alkanoyl or benzoyl groups: alkoxy-carbonyl, cyclohexyloxycarbonyl, phenoxycarbonyl, phenylalkyloxy-carbonyl groups, which ester groups are preferably unsubstituted but can be substituted in alkyl, alkoxy and/or halogen; unsubstituted carbamyl or sulfamyl groups or substituted carbamyl or sulfamyl groups, particularly those which are N-mono- or di-substituted by alkyl, hydroxyalkyl or alkoxyalkyl radicals, unsubstituted or particularly alkyl- or halogen-substituted sulfonic acid phenylamide and phenylalkylamide groups or sulfonyl- amide groups the amide nitrogen atom of which belongs to a heterocyclic nitrogen base radical which may contain further hetero atoms, i.e. to pyrrolidine, piperidine, morpholine or piperazine radicals, also alkylsulfonyl or arylsulfonyl groups, in particular alkylsulfonyl, halogenoalkylsulfonyl, phenylsulfonyl, alkylphenylsulfonyl or halogenophenylsulfonyl groups, aryloxysulfonyl groups particularly unsubstituted phenyloxysulfonyl or alkyl-, alkoxy- or halogen-substituted phenyloxy-sulfonyl groups, and finally, as particularly suitable electrophilic substituents the halogen atoms, chlorine, bromine and/or fluorine, the nitro, trifluoromethyl or the cyano group.

Examples of such electrophilic substituents are: acetyl, propionyl, butyryl, chloroacetyl, benzoyl, methylbenzoyl, bromobenzoyl and chlorobenzoyl groups, methoxycarbonyl, ethoxycarbonyl, isopropoxycarbonyl, butoxycarbonyl, phenyloxycarbonyl, methylphenyloxycarbonyl, benzyloxycarbonyl and chlorobenzyloxycarbonyl groups, the methylsulfonyl, ethylsulfonyl, chloromethylsulfonyl, butylsulfonyl, phenylsulfonyl, tolylsulfonyl, xylylsulfonyl, chlorophenylsulfonyl or bromophenylsulfonyl group, the sulfonic acid phenyl ester, cresyl ester, chlorophenyl ester and dichlorophenyl ester group, the carbamyl sulfamyl, N-methyl-, N-ethyl-, N-propyl-, N-butyl-, N-γ-methoxy-propyl-, N,N-dimethyl-, N,N-diethyl-, N,N-dibutyl-, N-methyl-N-hydroxyethyl-, N,N-dihydroxyethyl-, N,N-dihydroxypropyl-, N-phenyl-N-ethyl-, N-benzyl-, N,N-dibenzyl-carbamyl and -sulfamyl radicals, the piperidino or morpholino group.

In the compounds of Formula IB, the benzene radical Y is unsubstituted or it is mono- to tri-substituted by substituents which are either alkyl groups, alkoxy, hydroxyalkoxy, unsubstituted or halogen-substituted alkanoylamino groups, nitro groups or halogen atoms.

Thus, substituent or substituents $R_4$ at the central benzene ring can be, for example, methyl, ethyl, methoxy or ethoxy groups, and a benzene ring Y can be substituted by, for example, methyl, ethyl, isopropyl, tert.-butyl, tert.-amyl groups, methoxy, ethoxy, hydroxyethoxy, propoxy or butoxy groups, acetylamino, chloroacetylamino, propionylamino, β-bromopropionylamino groups, nitro groups as well as by fluorine, bromine and/or chlorine atoms.

When A is Formulas IA and II pertains to the radical of an aromatic diazonium compound of the heterocyclic series, it is also either unsubstituted or mono-to tri-substituted by the following radicals: unsubstituted phenyl, alkyl- and/or halogen-substituted phenyl, further alkyl- and halogenalkyl-sulfonyl groups, sulfamyl and nitro.

As examples of substituents in heterocyclic rings can be mentioned: the methyl, ethyl, isopropyl or tert.-butyl group, the phenyl, methylphenyl, chlorophenyl and dichlorophenyl group, the methylsulfonyl, ethylsulfonyl and butylsulfonyl group, the nitro group and the sulfamyl group.

A carbocyclic ring fused to the heterocyclic ring as in the benzothiazole radical may contain substituents defined above for carbocyclic ring A.

Particularly valuable dyestuffs are obtained with diazonium compounds of the benzene series which contain at least one and maximally three electrophilic substituents as mentioned before in o- and/or p-position to the diazo group, in particular with o-nitrophenyl and p-phenylazophenyl diazonium compounds.

Diazonium compounds of the carbocyclic or heterocyclic series usable according to the invention are derived, for example, from the following amines: 1-amino-2-nitrobenzene, 1-amino-2-nitro-4-methylbenezene, 1-amino-2-nitro-4-methoxy-, -4-ethoxy- or -4-phenoxy-benzene, 1-amino-2-nitro-4-chlorobenzene, 1-amino-2-nitrobenzene-4-sulphonic acid-amide, methylamide, -ethylamide, -N,N-dimethylamide, -N,N-diethylamide or -phenylamide, 1-amino-2-nitrobenzene-4-methyl sulphone, -4-ethyl sulphone, 1-amino-2-nitrobenzene-4-sulphonic acid phenyl ester, 1-amino-2-nitrobenzene-4-sulphonic acid-o- or -p- cresyl ester, 1-amino-2-nitro-4-trifluoromethylbenzene, 1-amino-4-nitrobenzene, 1-amino-4-nitro-2-methylbenzene, 1-amino-4-nitro-2-methoxy- or -2-ethoxy-benzene, 1-amino-4-nitro-2-chloro- or -2-bromo-benzene, 1-amino-4-nitro-2-cyanobenzene, 1-amino-4-nitro-2,5-dichlorobenzene, 1-amino-4-nitro-2,6-dichloro- or -dibromo-benzene, 1-amino-4-nitro-3-carbethoxy- or -3-carbobutoxy-benzene, 1-amino-2-, -3- or -4-chlorobenzene, 1-amino-2-, -3- or -4-bromobenzene, 1-amino-2,4-, -2,5- or -2,6-dichloro-benzene, 1-amino-3-nitro-4-fluorobenzene, 1-amino-2,4-, -2,5- or -3,4, dicyanobenzene, also 4-aminoazobenzene, -4-amino-2′,3-dimethylazobenzene, 4-amino-3′- or -4′-nitroazobenzene, 4-amino-2-methyl-5-methoxy-4′-nitroazobenzene, 4-amino-2,5-dimethoxy-4′-nitroazobenzene, 4-amino-2-methyl-5-methoxy-4′-hydroxyethoxy-azobenzene, 4-amino-2-methyl-5-methoxy-3′-hydroxy-ethoxy-azobenzene, 2-amino-5-nitrothiazole, 3-amino-1,2,4-triazole, 2-amino-5-methyl-1,3,4-thiadiazole, 3-amino-benzpyrazole, 2-amino-benzthiazole, 2-amino-6-methoxy-benzthiazole or 2-amino-6-methyl-sulphonyl-benzthiazole.

Preferred dyestuffs are derived, in particular, from 1-amino-2-nitrobenzene, 1-amino-2-nitro-4-methylbenzene, 1-amino-2-nitro-4-chlorobenzene, 1-amino-2-nitro-4-bromobenzene, 1-amino-2-nitro-4-methoxybenzene and 1-amino-2-nitro-4-ethoxybenzene.

In the coupling components of Formula I used according to the invention, $R_3$ as hydrocarbon radical preferably represents a low alkyl group, in particular the methyl group; it may also be the ethyl, propyl, butyl group; it can also be the phenyl or an alkyl-phenyl group. As carboxylic acid alkyl ester group, $R_3$ preferably represents the methoxycarbonyl or ethoxycarbonyl group. As carboxylic acid amide group, $R_3$ is, in particular, the carbamyl group or a carboxylic acid mono-lower-alkylamide or di-lower-alkylamide group.

The triazinyl ring of the coupling component according to the invention can contain identical or different inert monovalent substituents, alkyl, cycloalkyl having 6 to 8 carbon atoms, unsubstituted phenyl or phenyl radicals substituted by alkyl and/or halogen; the hydroxyl group; the mercapto group; alkoxy, alkylthio, hydroxyalkoxy, cyanoalkoxy groups; also ester groups, particularly the mono- and, preferably di-(alkoxycarbonyl)-methyl groups; the amino group; amino groups which are mono- or di-substituted by alkyl or phenyl radicals which are in turn not further substituted or are further substituted by cyano, hydroxyl, alkoxy and/or halogen, cycloalkylamino groups, unsubstituted or alkyl- and/or halogen-substituted benzylamino groups, heterocyclic nitrogen bases as defined hereinbefore and, finally, acylamino groups, preferably alkanoylamine and ureido groups.

Examples of substituents of the triazinyl ring are the following: methyl, ethyl, n- and isopropyl and n- and isobutyl, cyclohexyl, pheny, methylphenyl, chlorophenyl, bromophenyl, hydroxyl, methoxy, ethoxy, propoxy, butoxy, benzyloxy, chlorobenzyloxy or cyclohexyloxy groups, mercapto, methylthio, ethylthio and propylthio, di-(ethoxycarbonyl)-methyl, amino, methylamino, ethylamino, n- and iso-propylamino, butylamino, hydroxyethylamino, hydroxypropylamino, methoxypropylamino, N,N-dimethylamino, N,N-diethylamino, N,N-dibutylamino, N,N-dihydroxyethylamino, N,N-dihydroxypropylamino, N,N-dicyanoethylamino, N-methyl-N-hydroxyethylamino, phenylamino, chlorophenylamino, methylphenylamino, methoxyphenylamino, ethoxyphenylamino, N-phenyl-N-methylamino, N-phenyl-N-ethylamino, N-bromophenyl-N-ethylamino, N-phenyl-N-butylamino, cyclohexylamino, benzylamino, methylbenzylamino and chlorobenzylamino group, piperidino or morpholino, acetylamino and ureido.

Particularly suitable combinations of the inert monovalent substituents $R_1$ and $R_2$ of the triazinyl ring of the coupling components according to the invention are those in which:

(a) $R_1$ represents one of the following substituents: the amino group, an alkylamino or dialkylamino group which are unsubstituted or substituted by hydroxyl, alkoxy or cyano groups, radicals of heterocyclic amines such as the piperidino or morpholino radical, also alkoxy groups which are unsubstituted or substituted by halogen, alkoxy or cyano groups, or alkylthio groups, and (b) $R_2$ represents one of the substituents given under (a) or hydroxyl, mercapto, phenylamino, a phenylamino group substituted by halogen, alkyl or alkoxy, a cycloalkylamino group which has from 6 to 8 carbon atoms, an N-alkyl-N-phenylamino or an N-alkyl-N-cycloalkylamino group, an (N-phenylalkyl)-amino or N-alkyl-N-(phenylalkyl)-amino group, or phenylalkoxy or a cycloalkoxy group, each having a total of from 6 to 8 carbon atoms.

Because of the easy accessibility and good affinity to polyester fibers of the corresponding dye-stuffs of Formulas IA and IB, particularly valuable combinations of substituents $R_1$ and $R_2$ are those in which $R_1$ and $R_2$ are identical and represent an alkyl amino, a hydroxyalkylamino, an alkoxyalkylamino, a dialkylamino, an N-alkyl-N-hydroxyalkylamino or an alkoxy group.

Particularly valuable dyestuffs are those derived from coupling components of Formula I in which $R_3$ is an alkyl group, especially the methyl group, and $R_1$ and $R_2$ represent a monoalkylamino group, which is unsubstituted or substituted by halogen or alkoxy, a dialkylamino group, an N-alkyl-N-hydroxyalkylamino group or an alkoxy group, in particular those derived from 1-[4′,6′-bis-alkoxy-triazinyl-(2′)]-3-methyl-5-pyrazolones and 1-[4′,6′-bis-monoalkylamino- and bis-dialkylamino-triazinyl-(2′)]-3-methyl-5-pyrazolones.

Coupling components of Formula I, according to the invention, are produced, for example, by condensing reactive derivatives of β-ketocarboxylic acids with s-triazinyl-(2)-hydrazines and converting the hydrazones so obtained into 1-s-triazinyl-5-pyrazolones, preferably in dilute acetic acid, optionally also in aqueous medium in the presence of an alkali carbonate or ammonia, and at a raised temperature.

β-Ketocarboxylic acid compounds which are mainly used for the formation of the 1-s-triazinyl-5-pyrazolones are acetoacetic acid esters, benzoyl acetic acid esters or their amides as well as oxalic acid dialkyl esters.

s-Triazinyl-2-hydrazines are easily obtained, for example, from 2-chloro-4,6-di-inert-substituted 1,3,5-triazines and hydrazine.

The 1-s-triazinyl-5-pyrazolone-3-carboxylic acid amides or alkylamides can be produced without difficulty by known methods from the corresponding 1-s-triazinyl-5-pyrazolone-3-carboxylic acid alkyl esters with ammonia or alkylamines.

A diazonium compound as defined above is coupled with a coupling component of Formula I by the usual methods, preferably in mineral acid to weakly acid aqueous medium; advantageously in an acid coupling medium the mineral acid is gradually buffered, for example with alkali metal salts of low fatty acids, optionally in the presence of solubility promoters, e.g. low alkanols such as ethanol, ethylene glycol monomethyl or monoethyl ether, or of amides of low fatty acids, in particular dimethyl formamide.

The dyestuffs according to the invention are brought into finely distributed form by milling with dispersing agents. Suitable dispersing agents are, e.g. anionic dispersing agents such as alkylaryl sulfonates, condensation products of formaldehyde and naphthalene sulfonic acids, lignin sulfonates, or non-ionogenic dispersing agents such as fatty alcohol polyglycol ethers.

Dyestuffs according to the inveniton are suitable for the dyeing of hydrophobic organic synthetic textile fibers from aqueous dispersion, e.g. for the dyeing of cellulose di- and tri-acetate, particularly however, for the dyeing of high molecular esters of aromatic polycarboxylic acids with polyfunctional alcohols, e.g. of polyethylene glycol terephthalates such as Terylene, Dacron, Tergal, Trevira, Diolen as well as of other polymers such as Kodel.

The dyestuffs can also be used, however, for the dyeing of synthetic polyamide fibers such as nylon or Perlon.

Polyester fibers are dyed with aqueous dispersions of the dyestuffs according to the invention preferably at temperatures of over 100° C. under pressure. The dyeing can also be performed, however, at the boiling point of the water in the presence of carriers such as phenylphenol, polychlorobenzene compounds or other similar auxiliaries, or by the foulard process (pad-dyeing) followed by thermofixing at 180–210° C.

Dyestuffs according to the invention are distinguished by good affinity to hydrophobic polyester fibers, particularly to polyglycol trephthalates and, depending on their composition, they produce on these fibers greenish yellow, yellow to orange dyeings of good color strength which have very good fastness to washing, milling, sublimation, light, rubbing, perspiration, solvents, cross-dyeing, decatizing and gas fading. In addition the dyestuffs according to the invention have a very good reserve effect on vegetable fibers, particularly cotton. Also, level dyeings are obtained with the usual commercial carriers.

Because of their excellent fastness to sublimation in o- and/or p-position to the diazo group by electrophilic substituents, in particular from o-nitrophenyl diazonium compounds and coupling components according to the invention in which $R_1$ and $R_2$ are preferably either a monoalkylamino, a low alkoxy group or a dialkylamino group and $R_3$ is the methyl group, are particularly valuable. Dyestuffs according to the invention which are formed from 2-, 3- or 4-chlorophenyl diazonium compounds and the preferred coupling components mentioned above are distinguished by excellent levelling power when used combined with other dyestuffs, especially blue dyestuffs. They also possess excellent fastness to light.

The following non-limitative examples serve to illustrate the invention. Where not otherwise stated, parts and percentages are given therein by weight. The temperatures are in degrees centigrade. The relationship of parts by weight to parts by volume is as that of grams to cubic centimeters.

*Example 1*

A fine suspension of 17.3 parts of 1-amino-2-nitro-4-chlorobenzene in 300 parts of water and 30 parts of 36% hydrochloric acid is diazotised at 0–5° by the dropwise addition of a solution of 69 parts of sodium nitrite in 50 parts of water. The clear diazonium salt solution is added dropwise at 0–5° to a solution of 26.3 parts of 1-[4′,6′-bis-ethylamino-triazinyl-(2′)]-3-methyl-5-pyrazolone in 1300 parts of water, 75 parts of 36% hydrochloric acid and 150 parts of 80% acetic acid. The pH of the reaction mixture is then buffered with sodium acetate to 4–4.5. The yellow coupling product form, which corresponds to the formula

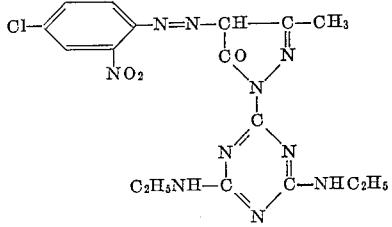

is filtered off, washed neutral with dilute sodium carbonate solution and then washed free of salt with water. The dyestuff is dried in vacuo at 60–70° and then milled with a mixture of lignin sulphonate and the sodium salt of a naphthalenic acid-formaldehyde condensation product. Polyglycol terephthalate fibres or cellulose triacetate fibres can be dyed in pure greenish yellow shades with the dye preparation so obtained, if desired with the addition of carriers such as o-phenylphenol. The dyeings have very good fastness to light and sublimation.

The 1-[4′,6′-bis-ethylamino-triazinyl-(2′)]-3-methyl-5-pyrazolone of M.P. 185–187° used in the above example as coupling component is obtained by condensing 2,4-bis-ethylamino-6-hydrazino-triazine with acetoacetic acid methyl ester and then recrystallising the crude product from ethyl alcohol.

Dyestuffs having similar properties are obtained if equivalent amounts of the diazo and coupling components given in the Examples 2 to 54 in the following table are coupled under the conditions given in Example 1.

TABLE I

| Example | Diazo component | Coupling component | Shade on polyester fibres |
|---|---|---|---|
| 2 | 1-amino-2-nitrobenzene | 1-[4′,6′-bis-methylaminotriazinyl-(2′)]-3-methyl-5-pyrazolone | Greenish yellow. |
| 3 | 1-amino-2-nitro-4-methylbenzene | ----- do ----- | Do. |
| 4 | 1-amino-2-nitro-4-methoxybenzene | ----- do ----- | Yellow. |
| 5 | 1-amino-2-nitro-4-trifluoromethylbenzene | ----- do ----- | Do. |
| 6 | 4-amino-azobenzene | ----- do ----- | Reddish yellow. |
| 7 | 1-amino-2-nitro-benzene | 1-[4′,6′-bis-ethylamino-triazinyl-(2′)]-3-methyl-5-pyrazolone | Greenish yellow. |
| 8 | 1-amino-2-nitro-4-methylbenzene | ----- do ----- | Do. |
| 9 | 1-amino-4-nitro-benzene | ----- do ----- | Do. |
| 10 | 1-amino-2-chloro-4-nitrobenzene | 1-[4′,6′-bis-ethylaminotriazinyl-(2′)]-3-methyl-5-pyrazolone | Greenish yellow. |
| 11 | 1-amino-4-nitro-3-carbobutoxybenzene | ----- do ----- | Do. |
| 12 | 4-amino-2′,3-dimethyl-azobenzene | ----- do ----- | Reddish yellow. |
| 13 | 1-amino-4-nitro-2,5-dichlorobenzene | 1-[4′,6′-bis-propylaminotriazinyl-(2′)]-3-methyl-5-pyrazolone | Yellow. |
| 14 | 1-amino-2-nitro-4-methylsulphonylbenzene | ----- do ----- | Greenish yellow. |
| 15 | 1-amino-2-nitrobenzene-4-sulphonic acid diethylamide | ----- do ----- | Yellow. |
| 16 | 1-amino-2-nitro-4-methylbenzene | 1-[4′,6′-bis-butylaminotriazinyl-(2′)]-3-methyl-5-pyrazolone | Greenish yellow. |
| 17 | 1-amino-4-nitro-2,6-dichlorobenzene | ----- do ----- | Yellow. |
| 18 | 4-amino-2-methyl-5-methoxy-4′-hydroxyethoxy-azobenzene | ----- do ----- | Orange. |
| 19 | 2-amino-6-methoxybenzthiazole | ----- do ----- | Reddish yellow. |
| 20 | 1-amino-2-nitro-4-chlorobenzene | 1-[4′,6′-bis-methoxypropylamino-triazinyl-(2′)]-3-methyl-5-pyrazolone | Greenish yellow. |
| 21 | 1-amino-4-nitrobenzene | ----- do ----- | Yellow. |
| 22 | 1-amino-2-nitro-4-methoxybenzene | ----- do ----- | Do. |
| 23 | 2-amino-5-nitrothiazole | ----- do ----- | Reddish yellow. |
| 24 | 1-amino-4-nitro-2-chlorobenzene | 1-[4′-phenylamino-6′-ethylamino-triazinyl-(2′)]-3-methyl-5-pyrazolone | Yellow. |
| 25 | 1-amino-2-methoxy-4-nitrobenzene | 1-[4′-butylamino-6′-N-methyl-N-hydroxyethyl-amino-triazinyl-(2′)]-3-methyl-5-pyrazolone | Do. |
| 26 | 1-amino-2,6-dichloro-4-nitrobenzene | 1-[4′,6′-bis-ethylamino-triazinyl-(2′)]-3-butyl-5-pyrazolone | Do. |
| 27 | 4-aminoazobenzene | ----- do ----- | Reddish yellow. |
| 28 | 1-amino-2-nitrobenzene | 1-[4′,6′-bis-propylamino-triazinyl-(2′)]-3-methyl-5-pyrazolone | Greenish yellow. |
| 29 | 1-amino-2-nitro-4-methylbenzene | ----- do ----- | Do. |
| 30 | 1-amino-2-nitro-4-chlorobenzene | ----- do ----- | Do. |
| 31 | 1-amino-2-nitro-4-bromobenzene | ----- do ----- | Do. |
| 32 | 1-amino-2-nitro-4-methoxybenzene | ----- do ----- | Yellow. |
| 33 | 1-amino-2-nitro-4-ethoxybenzene | ----- do ----- | Do. |
| 34 | 1-amino-2-nitro-4-phenoxybenzene | ----- do ----- | Do. |

TABLE I—Continued

| Example | Diazo component | Coupling component | Shade on polyester fibres |
|---|---|---|---|
| 35 | ....do.... | 1-[4',6'-bis-methylamino-triazinyl-(2')]-3-methyl-5-pyrazolone. | Do. |
| 36 | 1-amino-2-chlorobenzene | ....do.... | Greenish yellow. |
| 37 | 1-amino-2,4-dichlorobenzene | ....do.... | Do. |
| 38 | 1-amino-2-chlorobenzene | 1-[4',6'-bis-ethylamino-triazinyl-(2')]-3-methyl-5-pyrazolone | Do. |
| 39 | 1-amino-4-chlorobenzene | 1-[4',6'-bis-ethylamino-triazinyl-(2')]-3-methyl-5-pyrazolone | Do. |
| 40 | 1-amino-2-bromobenzene | ....do.... | Do. |
| 41 | 1-amino-2,4-dichlorobenzene | ....do.... | Do. |
| 42 | 1-amino-2,5-dichlorobenzene | ....do.... | Do. |
| 43 | 1-aminonaphthalene | ....do.... | Do. |
| 44 | 4-amino-4'-chloro-2-methyl-azobenzene | 1-[4',6'-bis-ethylamino-triazinyl-(2')]-3-methyl-5-pyrazolone | Yellow. |
| 45 | 1-nitro-3-amino-4-fluorobenzene | ....do.... | Reddish yellow. |
| 46 | 1-amino-2-nitrobenzene | ....do.... | Greenish yellow. |
| | | 1-[4'-hydroxy-6'-butyl-amino-triazinyl-(2')]-3-methyl-5-pyrazolone. | Do. |
| 47 | 1-amino-2-nitro-4-methylbenzene | ....do.... | Do. |
| 48 | 1-amino-2-nitro-4-chlorobenzene | 1-[4'-benzylamino-6'-methylamino-triazinyl-(2')]-3-methyl-5-pyrazolone. | Do. |
| 49 | ....do.... | 1-[4'-phenylamino-6'-hydroxyethylamino-triazinyl-(2')]-3-methyl-5-pyrazolone. | Do. |
| 50 | 1-amino-2,4-dichlorobenzene | 1-[4'-cyclohexylamino-6'-propylamino-triazinyl-(2')]-3-methyl-5-pyrazolone. | Do. |
| 51 | 1-amino-2-nitrobenzene | 1-[4',6'-bis-isopropylamino-triazinyl-(2')]-3-methyl-5-pyrazolone. | Do. |
| 52 | 1-amino-2-nitro-4-chlorobenzene | ....do.... | Do. |
| 53 | 1-amino-2-nitro-4-methylbenzene | ....do.... | Do. |
| 54 | 1-amino-2-nitro-4-ethoxybenzene | 1-[4',6'-bis-aminotriazinyl-(2')]-3-methyl-5-pyrazolone | Reddish yellow. |

*Example 55*

A fine suspension of 13.8 parts of 1-amino-2-nitrobenzene in 500 parts of water, 60 parts of 36% hydrochloric acid and 5 parts of cetyl polyglycol ether is diazotised in the usual way at 5–7° by the addition of 6.9 parts of sodium nitrate. The diazonium salt solution so obtained is clarified and added dropwise to a solution of 32 parts of 1 - [4',6'-bis-diethylaminotriazinyl-(2')]-3-methyl-5-pyrazolone in 1200 parts of water and 100 parts of 36% hydrochloric acid. The pH of the coupling bath is then raised to 4–4.5 by the addition of sodium acetate. On completion of the coupling, the yellow precipitate formed, which corresponds to the formula

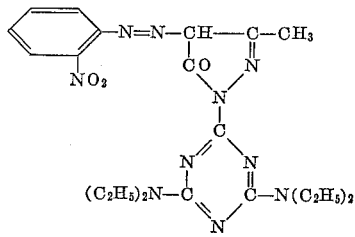

is filtered off, then washed with a lot of water and dried in vacuo at 60–70°. It is an orange coloured powder. After milling with the sodium salt of a condensation product of naphthalene-2-sulphonic acid and formaldehyde, the dyestuff so obtained, in aqueous dispersion, if desired in the presence of a carrier such as the sodium salt of o-phenylphenol, dyes polyglycol terephthalate fibres in pure greenish yellow shades. The dyeings have very good fastness to washing, water, rubbing, light and sublimation.

The 1-[4',6'-bis-diethylamino-triazinyl-(2')]-3-methyl-5-pyrazolone used in this example for the coupling is obtained in the following manner:

127 parts of 2,4-bis-diethylamino-6-hydrazinotriazine are mixed with 61 parts of methyl acetoacetate, 150 parts of aqueous 80%-acetic acid and 300 parts of water are heated during 48 hours at 40 to 50°. The reaction mixture is mixed with 2000 parts of water, 1200 parts of aqueous 30%-sodium hydroxide solution are added drop by drop, and the resulting mixture is heated to 70°. 5 parts of animal charcoal are added to the hot alkaline solution and then clarified by filtration through china clay, the filtrate is cooled and neutralized by the drop-by-drop addition of concentrated hydrochloric acid. The resulting precipitate is separated by filtration and dried in 10 torr vacuum at 45°. 133 parts of the above-described starting material of a purity of 91.7% are obtained, corresponding to a 76%-yield rate. The pure compound having the melting point 97–98° is obtained from the crude condensation product by recrystallization from a mixture of low boiling hydrocarbons.

By repeating the above example, but coupling, instead of 13.8 parts of 1-amino-2-nitrobenzene, a corresponding amount of the diazo components given in column 2 of the following Table of the examples 56 to 80, under the conditions described, with an equimolar amount of the coupling components given in column 3, then dyestuffs are obtained which produce polyglycol terephthalate fibres having similarly good properties.

TABLE II

| Example | Diazo component | Coupling component | Shade on polyester fibres |
|---|---|---|---|
| 56 | 1-amino-2-nitro-4-methylbenzene | 1-[4',6'-bis-dimethylamino-triazinyl-(2')]-3-methyl-5-pyrazolone. | Greenish yellow. |
| 57 | 1-amino-2-nitro-4-chlorobenzene | ....do.... | Do. |
| 58 | 1-amino-2-nitro-4-methoxybenzene | ....do.... | Yellow. |
| 59 | 1-amino-2-nitrobenzene-4-sulfonic acid phenyl ester | ....do.... | Do. |
| 60 | 1-amino-2-nitro-4-trifluoromethyl-benzene | ....do.... | Do. |
| 61 | 1-amino-2,4-dicyanobenzene | 1-[4',6'-bis-dimethylaminotriazinyl-(2')]-3-methyl-5-pyrazolone. | Do. |
| 62 | 1-amino-2-nitro-4-chlorobenzene | 1-[4',6'-bis-diethylaminotriazinyl-(2')]-3-methyl-5-pyrazolone. | Greenish yellow. |
| 63 | 1-amino-2-chloro-4-nitrobenzene | ....do.... | Do. |
| 64 | 4-amino-azobenzene | ....do.... | Reddish yellow. |
| 65 | 2-amino-5-nitrothiazole | ....do.... | Yellow. |
| 66 | 1-amino-4-nitro-2,5-dichlorobenzene | 1-[4',6'-bis-dibutylaminotriazinyl-(2')]-3-methyl-5-pyrazolone. | Do. |
| 67 | 1-amino-2-nitrobenzene-4-sulphonic acid diethylamide | ....do.... | Do. |
| 68 | 4-amino-2',3-dimethyl-azobenzene | ....do.... | Reddish yellow. |
| 69 | 1-amino-4-nitro-3-carbobutoxybenzene | 1-[4',6'-bis-N-methyl-N-hydroxyethyl-triazinyl-(2')]-3-methyl-5-pyrazolone. | Yellow. |
| 70 | 2-amino-6-methylsulphonyl-benzthiazole | ....do.... | Do. |
| 71 | 1-amino-2-nitro-4-ethylsulphonylbenzene | ....do.... | Do. |

TABLE II—Continued

| Example | Diazo component | Coupling component | Shade on polyester fibres |
|---|---|---|---|
| 72 | ....do.... | 1-[4',6'-bis-N-methyl-N-hydroxyethyl-triazinyl-(2')]-3-phenyl-5-pyrazolone. | Do. |
| 73 | 1-amino-2-nitro-4-methylbenzene | ....do.... | Do. |
| 74 | 4-amino-azobenzene | ....do.... | Reddish yellow. |
| 75 | 1-amino-2-nitro-4-phenoxybenzene | 1-[4',6'-bis-dihydroxyethylamino-triazinyl-(2')]-3-methyl-5-pyrazolone. | Yellow. |
| 76 | 1-amino-2-nitrobenzene | 1-[4'-(2''-methylphenyl)-amino-6'-diethylamino-triazinyl-(2')]-3-methyl-5-pyrazolone. | Greenish yellow. |
| 77 | 1-amino-2-nitro-4-chlorobenzene | 1-[4'-hydroxy-6'-diethylamino-triazinyl-(2')]-3-methyl-5-pyrazolone. | Do. |
| 78 | 2-amino-6-cyanobenzthiazole | ....do.... | Reddish yellow. |
| 79 | 1-amino-2-nitro-4-methylbenzene | 1-[4'-propylamino-6'-diethylamino-triazinyl-(2')]-3-methyl-5-pyrazolone. | Greenish yellow. |
| 80 | 1-amino-2-nitro-4-chlorobenzene | ....do.... | Do. |

*Example 81*

A fine suspension of 19.7 parts of 4-amino-azobenzene in 500 parts of water, 75 parts of 36% hydrochloric acid and 5 parts of oleyl polyglycol ether is diazotised in the usual way by the addition of 6.9 parts of sodium nitrate. The clarified diazonium salt solution is added dropwise at 0–10° to a solution of 26.5 parts of 1-[4',6'-bis-ethoxy-triazinyl-(2')]-3-methyl-5-pyrazolone in 1300 parts of water and 200 parts of 80% acetic acid. The pH of the coupling bath is then raised to 4.5–5 by the addition of sodium acetate. The coupling is completed by stirring the reaction mixture for some hours at 5–10°. The orange precipitate formed is filtered off, washed with water and sodium salt of a condensation product of naphthalene-2-sulphonic acid and formaldehyde dyes polyglycol terephthalate fibres in pure golden yellow shades from an aqueous dispersion if desired in the presence of carriers such as o-phenylphenol. The dyeings have very good fastness to washing, light and sublimation.

The 1-[4',6'-bis-ethoxy-triazinyl-(2')]-3-methyl-5-pyrazolone used in the above example as coupling component is obtained by condensation of 2,4-bis-ethoxy-6-hydrazino-triazine with acetoacetic acid methyl ester. The pure compound melts at 151–152°.

Dyestuffs having similar properties are obtained if equivalent amounts of the diazo and coupling components given in the Examples 82 to 111 of the following table are coupled under the conditions described in Example 81.

TABLE III

| Example | Diazo component | Coupling component | Shade on polyester fibres |
|---|---|---|---|
| 82 | 1-amino-2-nitro-4-methylbenzene | 1-[4',6'-bis-methoxy-triazinyl-(2')]-3-methyl-5-pyrazolone | Greenish yellow. |
| 83 | 1-amino-2-nitro-4-phenoxybenzene | ....do.... | Do. |
| 84 | 1-amino-4-nitro-2-bromobenzene | ....do.... | Do. |
| 85 | 1-amino-2-nitrobenzene-4-sulphonic acid phenyl ester | ....do.... | Do. |
| 86 | 1-amino-4-nitro-2,6-dichlorobenzene | ....do.... | Yellow. |
| 87 | 4-amino-2-methyl-5-methoxy-4'-nitroazobenzene | ....do.... | Orange. |
| 88 | 4-amino-2-methyl-5-methoxy-4'-hydroxyethoxy-azobenzene. | ....do.... | Do. |
| 89 | ....do.... | 1-[4',6'-bis-ethoxy-triazinyl-(2')]-3-methyl-5-pyrazolone | Do. |
| 90 | 1-amino-2-nitrobenzene | ....do.... | Greenish yellow. |
| 91 | 1-amino-2-nitro-4-methylbenzene | ....do.... | Do. |
| 92 | 1-amino-2-nitro-4-methoxybenzene | ....do.... | Yellow. |
| 93 | 1-amino-2-nitro-4-chlorobenzene | ....do.... | Greenish yellow. |
| 94 | 1-amino-4-nitro-2-chlorobenzene | ....do.... | Yellow. |
| 95 | 1-amino-4-nitro-2-methylbenzene | ....do.... | Do. |
| 96 | 1-amino-2-nitro-4-methoxybenzene | ....do.... | Do. |
| 97 | 1-amino-2-nitro-4-chlorobenzene | 1-[4',6'-bis-isopropyloxy-triazinyl-(2')]-3-methyl-5-pyrazolone. | Greenish yellow. |
| 98 | 1-amino-2-nitro-4-methoxybenzene | ....do.... | Yellow. |
| 99 | 1-amino-4-nitrobenzene | ....do.... | Do. |
| 100 | 1-amino-4-nitro-2-chlorobenzene | 1-[4',6'-bis-butyloxy-triazinyl-(2')]-3-ethyl-5-pyrazolone | Do. |
| 101 | 1-amino-4-nitro-2,6-dichlorobenzene | ....do.... | Do. |
| 102 | 4-amino-azobenzene | ....do.... | Reddish yellow. |
| 103 | ....do.... | 1-[4',6'-bis-ethoxy-triazinyl-(2')]-3-butyl-5-pyrazolone | Do. |
| 104 | 1-amino-2-nitro-4-methylbenzene | ....do.... | Greenish yellow. |
| 105 | 2-amino-5-nitrothiazole | ....do.... | Yellow. |
| 106 | 1-amino-2-nitro-4-chlorobenzene | 1-[4'-methoxyethoxy-6'-ethylamino-triazinyl-(2')]-3-methyl-5-pyrazolone. | Greenish yellow. |
| 107 | 1-amino-4-nitro-2-methylbenzene | 1-[4'-ethoxy-6'-propylamino-triazinyl-(2')]-3-methyl-5-pyrazolone. | Yellow. |
| 108 | ....do.... | 1-[4'-methoxy-6'-diethylamino-triazinyl-(2')]-3-methyl-5-pyrazolone. | Do. |
| 109 | 1-amino-2,5-dichlorobenzene | 1-[4'-methoxy-6'-benzylamino-triazinyl-(2')]-3-methyl-5-pyrazolone. | Greenish yellow. |
| 110 | ....do.... | 1-[4'-ethoxy-6'-(4''-chlorophenyl)-amino-triazinyl-(2')]-3-methyl-5-pyrazolone. | Do. |
| 111 | 1-amino-4-nitro-2-methoxybenzene | ....do.... | Yellow. | dried in vacuo at 60–70°. The dyestuff is a red powder which corresponds to the formula

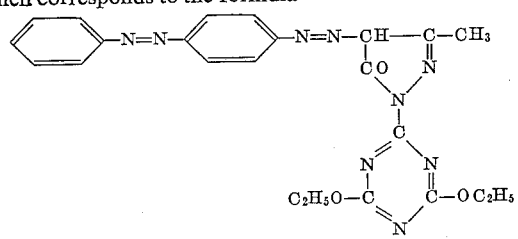

A preparation produced by milling the dyestuff with the

*Example 112*

The diazonium salt solution of 15.2 parts of 1-amino-2-nitro-4-methylbenzene is added dropwise at 0–5° to a solution of 1-[4',6'-bis-piperidino-triazinyl-(2')]-3-methyl-5-pyrazolone in 140 parts of 36% hydrochloric acid, 300 parts of 80% acetic acid and 950 parts of water. The pH of the reaction mixture is raised after 1 hour to 4–4.5 by the addition of sodium acetate. On completion of the coupling the precipitated yellow precipitate is filtered off, washed neutral with dilute sodium carbonate solution and then free of salt with water. The dyestuff so obtained, which corresponds to the formula

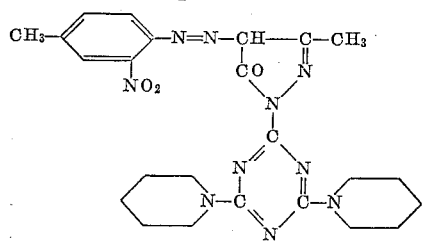

is dried in vacuo at 70–80° and then milled with the sodium salt of a condensation product of naphthalene-2-sulphonic acid and formaldehyde. Polyglycol terephthalate fibres can be dyed from an aqueous dispersion of this preparation, if desired in the presence of a carrier such as o-phenylphenol, in pure greenish yellow shades. The dyeings have very good fastness to perspiration, rubbing, light and sublimation.

The 1-[4',6'-bis-piperidino-trazinyl-(2')]-3-methyl-5-pyrazolone used in the above example as starting material is obtained by reacting 2,4-bis-piperidino-6-hydrazino-triazine with acetoacetic acid methyl ester. The pure coupling component melts at 212–213° and is obtained from the crude condensation product by recrystallisation from methanol.

Dyestuffs having similar properties are obtained if in Example 112, instead of the 15.2 parts of 1-amino-2-nitro-4-methylbenzene, corresponding amounts of the diazo components given in column 2 of the following table of the Examples 113–117 are used and these are coupled with the corresponding amounts of the coupling components described in column 3.

of 80% acetic acid. The diazonium salt solution previously prepared is added dropwise at 0–5° to this solution, and the mineral acid is buffered by the addition of sodium acetate. To complete the coupling, the reaction mixture is stirred overnight at 0–5°. The orange-yellow precipitate formed is then filtered off, washed with water and dried in the usual way. The composition of the dyestuff obtained corresponds to the formula

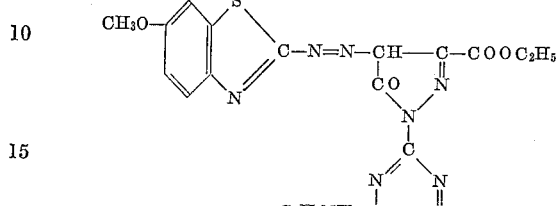

A preparation obtained by milling the dyestuff with the sodium salt of a condensation product of naphthalene-2-sulphonic acid and formaldehyde dyes polyglycol terephthalate fibres in pure orange shades from an aqueous dispersion, if desired in the presence of carriers such as o-phenylphenol. The dyeings have very good fastness to washing, perspiration, rubbing and sublimation.

The 1 - [4',6' - bis - ethylamino - triazinyl - (2') ] - 3 - carbethoxy-5-pyrazolone used in this example as starting material is obtained by condensing 2,4-bis-ethylamino-6-hydrazino-triazine with oxalacetic acid diethyl ester. If this ester is added to a concentrated aqueous ammonia solution, then the corresponding 1-[4',6'-bis-ethylamino-triazinyl-(2')]-3-carbamyl-5-pyrazolone is formed. A good yield is obtained.

TABLE IV

| Example | Diazo component | Coupling component | Shade on polyester fibres |
|---|---|---|---|
| 113 | 1-amino-2-nitro-4-methoxybenzene | 1-[4',6'-bis-piperidino-triazinyl-(2')]-3-methyl-5-pyrazolone | Yellow. |
| 114 | 1-amino-4-nitro-2-chlorobenzene | ----do---- | Do. |
| 115 | 1-amino-4-nitro-2,5-dichlorobenzene | ----do---- | Do. |
| 116 | 1-amino-2-nitro-4-methylbenzene | 1-[4',6'-bis-morpholino-triazinyl-(2')]-3-methyl-5-pyrazolone | Greenish yellow. |
| 117 | 1-amino-4-nitro-2-methoxybenzene | ----do---- | Yellow. |

*Example 118*

18 parts of 2-amino-6-methoxy-benzthiazole in 100 parts of concentrated sulphuric acid are diazotised for 3 hours at −5° with nitrosyl sulphuric acid, corresponding to 6.9 parts of sodium nitrite.

32.1 parts of 1-[4',6'-bis-ethylamino-triazinyl-(2')]-3-carbethoxy-5-pyrazolone are dissolved in 1200 parts of water, 150 parts of 36% hydrochloric acid and 250 parts If in the above example, the 18 parts of 2-amino-6-methoxybenzthiazole are replaced by a corresponding amount of the diazo components given in column 2 of the following table of the Examples 119–134 and these are coupled under the conditions described with a corresponding amount of the coupling components given in column 3, then dyestuffs are obtained which produce dyeings on polyglycol terephthalate fibres having similarly good properties.

TABLE

| Example | Diazo component | Coupling component | Shade on polyester fibres |
|---|---|---|---|
| 119 | 1-amino-2-nitrobenzene | 1-[4',6'-bis-ethylamino-triazinyl-(2')]-3-carbethoxy-5-pyrazolone. | Yellow. |
| 120 | 1-amino-2-nitro-4-methylbenzene | ----do---- | Reddish yellow. |
| 121 | 1-amino-2-nitro-4-methoxybenzene | ----do---- | Orange. |
| 122 | 1-amino-4-nitrobenzene | 1-[4',6'-bis-diethylamino-triazinyl-(2')]-3-carbethoxy-5-pyrazolone. | Yellow. |
| 123 | 4-aminoazobenzene | ----do---- | Reddish orange. |
| 124 | ----do---- | 1-[4',6'-bis-methoxy-triazinyl-(2')]-3-carbethoxy-5-pyrazolone. | Do. |
| 125 | 4-amino-2,5-dimethyl-4'-hydroxyethoxy-azobenzene | ----do---- | Scarlet. |
| 126 | 1-amino-4-nitro-2,6-dichlorobenzene | 1-[4',6'-bis-butylamino-triazinyl-(2')]-3-carbomethoxy-5-pyrazolone. | Reddish yellow. |
| 127 | 1-amino-2-nitro-4-chlorobenzene | 1-[4',6'-bis-methylamino-triazinyl-(2')]-3-carbethoxy-5-pyrazolone. | Yellow. |
| 128 | 1-amino-2-nitro-4-methoxybenzene | 1-[4',6'-bis-butyloxy-triazinyl-(2')]-3-carbethoxy-5-pyrazolone. | Orange. |
| 129 | 1-amino-2-nitro-4-ethylsulphonylbenzene | ----do---- | Do. |
| 130 | 1-amino-2-nitro-4-methylbenzene | 1-[4',6'-bis-ethylamino-triazinyl-(2')]-3-carbomethoxy-5-pyrazolone. | Yellow. |
| 131 | ----do---- | 1-[4',6'-bis-methylamino-triazinyl-(2')]-3-carbamyl-5-pyrazolone. | Reddish yellow. |

TABLE—Continued

| Example | Diazo component | Coupling component | Shade on polyester fibres |
|---|---|---|---|
| 132 | 1-amino-2-nitro-benzene | 1-[4',6'-bis-hexylaminotriazinyl-(2')[-3-methyl-5-pyrazolone | Greenish. |
| 133 | ----do---- | 1-[4',6'-bis-(α-cyanoethylamino)-triazinyl-(2')-3-methyl-5-pyrazolone. | Do. |
| 134 | ----do---- | 1-[4',6'-bis-(N-methyl-N-γ-methoxy-propyl-amino)-triazinyl-(2')[-3-methyl-5-pyrazolone. | Yellow. Do. |
| 135 | ----do---- | 1-[4'-methylamino-6'-N,N-di-β-cyanoethyl-aminotriazinyl-(2')]-3-methyl-5-pyrazolone. | Do. |
| 136 | 1-amino-2-nitro-4-chlorobenzene | 1-[4',6'-bis-(β-chloroethoxy)-triazinyl-(2')]-3-methyl-5-pyrazolone. | Do. |
| 137 | ----do---- | 1-[4',6'-bis-(β-methoxyethoxy)-triazinyl-(2')]-3-ethyl-5-pyrazolone. | Do. |
| 138 | ----do---- | 1-[4',6'-bis-(β-cyanoethoxy)-triazinyl-(2')-3-methyl-5-pyrazolone. | Do. |
| 139 | 1-amino-2-nitro-4-methyl-benzene | 1-[4',6'-bis-methylthiotriazinyl-(2')]-3-n-butyl-5-pyrazolone | Yellow. |
| 140 | ----do---- | 1-[4'-N,N-diethylamino-6'-cyclohexyloxy-triazinyl-(2')]-3-methyl-5-pyrazolone. | Do. |
| 141 | ----do---- | 1-[4'-methylamino-6'-cyclohexyloxy-triazinyl-(2')]-3-methyl-5-pyrazolone. | Do. |
| 142 | 1-amino-2-nitro-4-ethoxy-benzene | 1-[4'-ethylamino-6'-benzyloxy-triazinyl-(2')[-3-methyl-5-pyrazolone. | Reddish yellow. |
| 143 | 1-amino-2-chloro-benzene | 1-[4'-methylamino-6'-(4''-methoxyphenylamino)-triazinyl-(2')]-3-methyl-5-pyrazolone. | Greenish yellow. |
| 144 | 1-amino-2-chloro-benzene | 1-[4'-ethoxy-6'-phenylethylamino-triazinyl-(2')]-3-methyl-5-pyrazolone. | Do. |
| 145 | 1-amino-2-bromobenzene | 1-[4'-n-butoxy-6'-(N-methyl-N-phenylamino)-triazinyl-(2')]-3-methyl-5-pyrazolone. | Do. |
| 146 | 1-amino-2-chloro-4-nitro-benzene | 1-[4'-ethylamino-6'-(N-methyl-N-cyclohexylamino)-triazinyl-(2')]-3-methyl-5-pyrazolone. | Do. |
| 147 | ----do---- | 1-[4'-methylamino-6'-(N-benzylamino)-triazinyl-(2')]-3-methyl-pyrazolone. | Do. |

Example 148

2 parts of the dyestuff obtained according to Example 1 are dispersed in 4000 parts of water. 12 parts of the sodium salt of o-phenylphenol, as carrier, and 12 parts of diammonium phosphate are added to this dispersion and 100 parts of polyglycol terephthalate yarn are dyed for 1½ hours at 95–98°. The dyeing is rinsed and after-treated with dilute sodium hydroxide solution and a dispersing agent.

In this way a greenish yellow dyeing is obtained which is fast to washing, light and sublimation.

If, in the above example, the 100 parts of polyglycol terephthalate yarn is replaced by 100 parts of cellulose triacetate fabric, dyeing is performed under the conditions given and the dyeing is then rinsed with water, then a greenish yellow dyeing is obtained which has very good fastness to washing and sublimation.

Example 149

In a pressure dyeing apparatus, 2 parts of the dyestuff obtained according to Example 29 are finely suspended in 2000 parts of water containing 4 parts of oleyl polyglycol ether. The pH of the dye bath is adjusted to 6–6.5 with acetic acid.

100 parts of polyglycol terephthalate fabric are introduced at 50°, the bath is heated to 140° within 30 minutes and dyeing is performed for 50 minutes at this temperature. The dyeing is then rinsed with water, soaped and dried. Under these conditions, a greenish yellow dyeing is obtained which is fast to washing, perspiration, light and sublimation.

The dyestuffs described in the other examples produce dyeings of equal quality by this process.

Example 150

Polyglycol terephthalate fabric (such as Dacron) is impregnated in a foulard at 40° with a liquor of the following composition:

20 parts of the dyestuff obtained according to Example 8, finely dispersed in
7.5 parts of sodium alginate,
20 parts of triethanolamine,
20 parts of octylphenol polglycol ether and
900 parts of water.

The fabric is squeezed out to about 100% liquor content, dried at 100° and then the dyeing is fixed for 30 seconds at a temperature of 210°. The dyed goods are rinsed with water, soaped and dried. Under these conditions, a greenish yellow dyeing is obtained which is fast to washing, rubbing, light and sublimation.

The dyestuffs described in the other examples produce dyeings of equal quality by this process.

We claim:

1. A yellow to orange metal-free monoazo dye-stuff free from groups dissociating acid in water and from sulfonic acid amide, carbonic acid amide and aryloxy-sulfonyl radicals, which dyestuff is of the formula

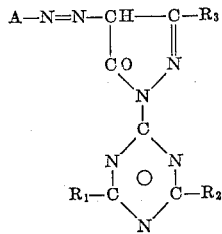

wherein

A represents an azo dyestuff diazo component radical selected from the group consisting of a benzene diazo component, a naphthalene diazo component, a thiazole diazo component and a benzothiazole diazo component, $R_1$ is a member selected from the group consisting of —$NH_2$, N-alkyl-amino wherein "alkyl" is of from 1 to 6 carbon atoms, N-hydroxy-alkylamino wherein "alkyl" is of from 2 to 6 carbon atoms, N-lower alkoxy-alkylamino wherein alkyl is of from 2 to 4 carbon atoms, β-cyanoethyl amino, N,N-di-alkyl-amino, N,N-bis-(hydroxy-alkyl)-amino wherein each alkyl is of from 2 to 3 carbon atoms, N-alkyl-N-hydroxy-alkyl-amino wherein "hydroxy-alkyl" is of from 2 to 3 carbon atoms, N-alkyl-N-alkoxy-alkyl-amino wherein the last-mentioned alkyl is of from 2 to 3 carbon atoms, N,N-bis - (β - cyano - ethyl) - amino, piperidinyl - (1), morpholinyl-(1), alkoxy of from 1 to 6 carbon atoms, chloro- and bromo-alkoxy, alkoxy-alkoxy, cyano-alkoxy, the four latter members having from 2 to 4 carbon atoms in the alkoxymoiety linked to the triazinyl nucleus, and alkylthio of from 1 to 6 carbon atoms;

$R_2$ is a member selected from the group consisting of the radicals defined above under $R_1$, hydroxy, mercapto, phenylamino, chlorophenylamino, bromophenylamino, lower alkyl phenylamino, lower alkoxy phenylamino, cyclohexylamino, benzylamino, phenylethylamino, N- lower alkyl-N-phenylamino, N-lower alkyl-N-cyclohexylamino, N-lower alkyl-N-benzylamino, benzyloxy and cyclohexyloxy, and $R_3$ is a member selected from the group consisting of alkyl, phenyl, alkylphenyl, alkoxycarbonyl, carbomyl, N-alkyl-carbamyl and N,N-dialkyl-carbamyl.

2. A dyestuff of the formula

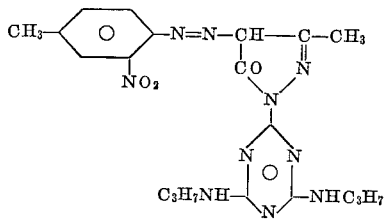

3. A dyestuff of the formula

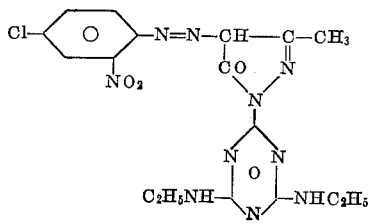

4. A dyestuff of the formula

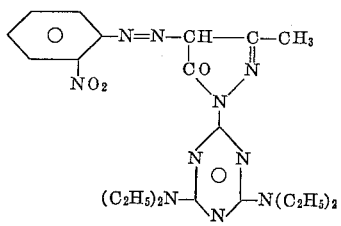

5. A dyestuff of the formula

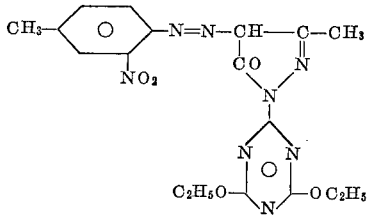

No references cited.

CHARLES B. PARKER, *Primary Examiner.*
D. M. PAPUGA, *Assistant Examiner.*